(12) United States Patent
Griffiths et al.

(10) Patent No.: US 12,207,060 B2
(45) Date of Patent: Jan. 21, 2025

(54) TRANSIENT MULTI-TONE TEST SIGNAL AND METHOD FOR AUDIO SPEAKERS

(71) Applicant: Dolby Laboratories Licensing Corporation, San Francisco, CA (US)

(72) Inventors: Kelvin Francis Griffiths, Porthcawl (GB); John Stewart, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 242 days.

(21) Appl. No.: 17/926,837

(22) PCT Filed: May 27, 2021

(86) PCT No.: PCT/US2021/034622
§ 371 (c)(1),
(2) Date: Nov. 21, 2022

(87) PCT Pub. No.: WO2021/243084
PCT Pub. Date: Dec. 2, 2021

(65) Prior Publication Data
US 2023/0199414 A1    Jun. 22, 2023

Related U.S. Application Data

(60) Provisional application No. 63/185,567, filed on May 7, 2021, provisional application No. 63/030,812, filed on May 27, 2020.

(51) Int. Cl.
*H04R 29/00*    (2006.01)
*G01H 3/08*    (2006.01)

(52) U.S. Cl.
CPC ............. *H04R 29/001* (2013.01); *G01H 3/08* (2013.01)

(58) Field of Classification Search
None
See application file for complete search history.

(56) References Cited

U.S. PATENT DOCUMENTS 7,813,514 B2 * 10/2010 Asada .................. H04R 29/001
                                                                    700/94
8,624,602 B2 *  1/2014 Quan ..................... G01R 23/20
                                                                    714/724

(Continued)

FOREIGN PATENT DOCUMENTS

EP      3270377        1/2018
JP      2506863 B2 *   6/1996   ............. H04R 29/00

OTHER PUBLICATIONS

Klippel, W. et al "Loudspeaker Testing at the Production Line" AES, May 20, 2006, pp. 1-14.

(Continued)

*Primary Examiner* — Oyesola C Ojo

(57) ABSTRACT

A transient multi-tone test signal is generated to detect piano noise distortion played back by a speaker. The test signal has a number, such as three, formant tones resembling a piano chord and selectable such that the frequencies and harmonics remain distributed in frequency. The test signal provides a basis for defining normal speaker operating performance and allows a user to define speaker responses that fall outside of normal boundaries by highlighting piano noise distortion detected during speaker playback of the test signal.

11 Claims, 10 Drawing Sheets

(56) References Cited

U.S. PATENT DOCUMENTS

| | | | | |
|---|---|---|---|---|
| 8,964,996 B2* | 2/2015 | Klippel | ............... | H04R 29/00 |
| | | | | 381/56 |
| 9,025,781 B2* | 5/2015 | Park | ............... | G10L 25/69 |
| | | | | 381/56 |
| 9,123,325 B2* | 9/2015 | Iseki | ............... | H04R 3/02 |
| 9,202,450 B2* | 12/2015 | Vainiala | ............... | G10H 1/16 |
| 9,232,913 B2* | 1/2016 | Lodwig | ............... | A61B 5/7203 |
| 9,277,341 B2* | 3/2016 | Mihelich | ............... | H04R 29/001 |
| 10,015,608 B2* | 7/2018 | Crawley | ............... | H04R 29/001 |
| 10,153,744 B1* | 12/2018 | Every | ............... | H04S 7/301 |
| 2010/0135501 A1* | 6/2010 | Corbett | ............... | H04S 7/301 |
| | | | | 381/58 |
| 2014/0358532 A1* | 12/2014 | Lin | ............... | H04S 7/305 |
| | | | | 704/226 |
| 2017/0061982 A1* | 3/2017 | Pakarinen | ............... | H03G 5/005 |
| 2017/0127206 A1* | 5/2017 | Skovenborg | ............... | H04R 29/007 |
| 2018/0018984 A1* | 1/2018 | Dickins | ............... | G10L 21/0232 |
| 2022/0271724 A1* | 8/2022 | Quan | ............... | H04R 3/04 |

OTHER PUBLICATIONS

Stefan, I. et al "Fast and Sensitive End-of-Line Testing" AES Convention 144, May 2018, pp. 1-12.

Temme, S. et al "A New Method for Measuring Distortion Using a Multitone Stimulus and Noncoherence" J. Audio Eng. Soc., vol. 56, No. 3, Mar. 2008, pp. 176-188.

Yang, Y. et al "A Fast Method with Experiment for Loudspeaker Defects Detection" Sep. 2010, Shengxue Xuebao/Acta Acustica.

* cited by examiner

| FORMANT 1 | FORMANT 2 | FORMANT 3 |
|---|---|---|
| 31.5 | 34.335 | 36.855 |
| 40 | 43.6 | 46.8 |
| 50 | 54.5 | 58.5 |
| 63 | 68.67 | 73.71 |
| 80 | 87.2 | 93.6 |
| 100 | 109 | 117 |
| 125 | 136.25 | 146.25 |
| 160 | 174.4 | 187.2 |
| 200 | 218 | 234 |
| 250 | 272.5 | 292.5 |
| 315 | 343.35 | 368.55 |
| 400 | 436 | 468 |
| 500 | 545 | 585 |
| 630 | 686.7 | 737.1 |
| 800 | 872 | 936 |
| 1000 | 1090 | 1170 |

← 400

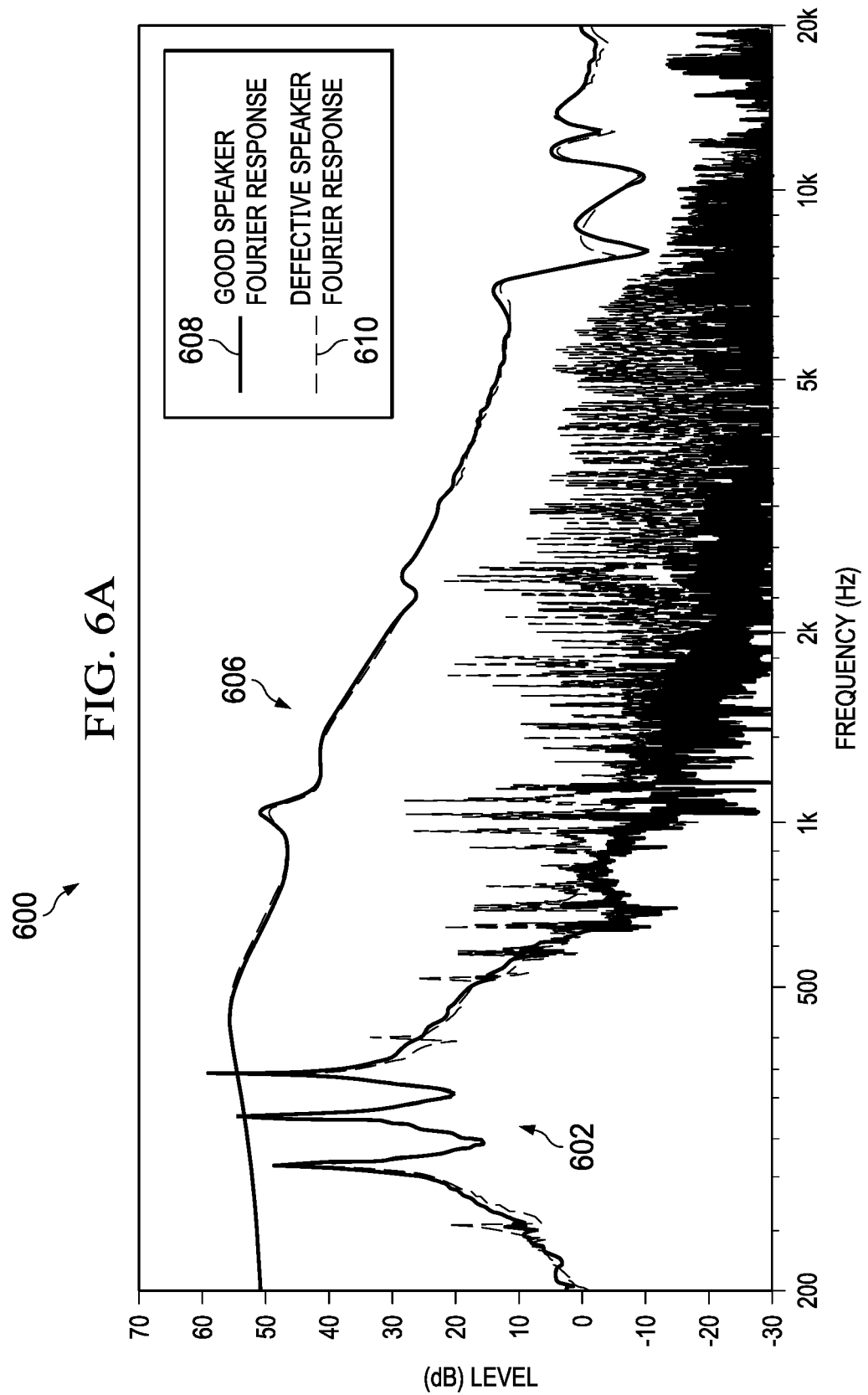

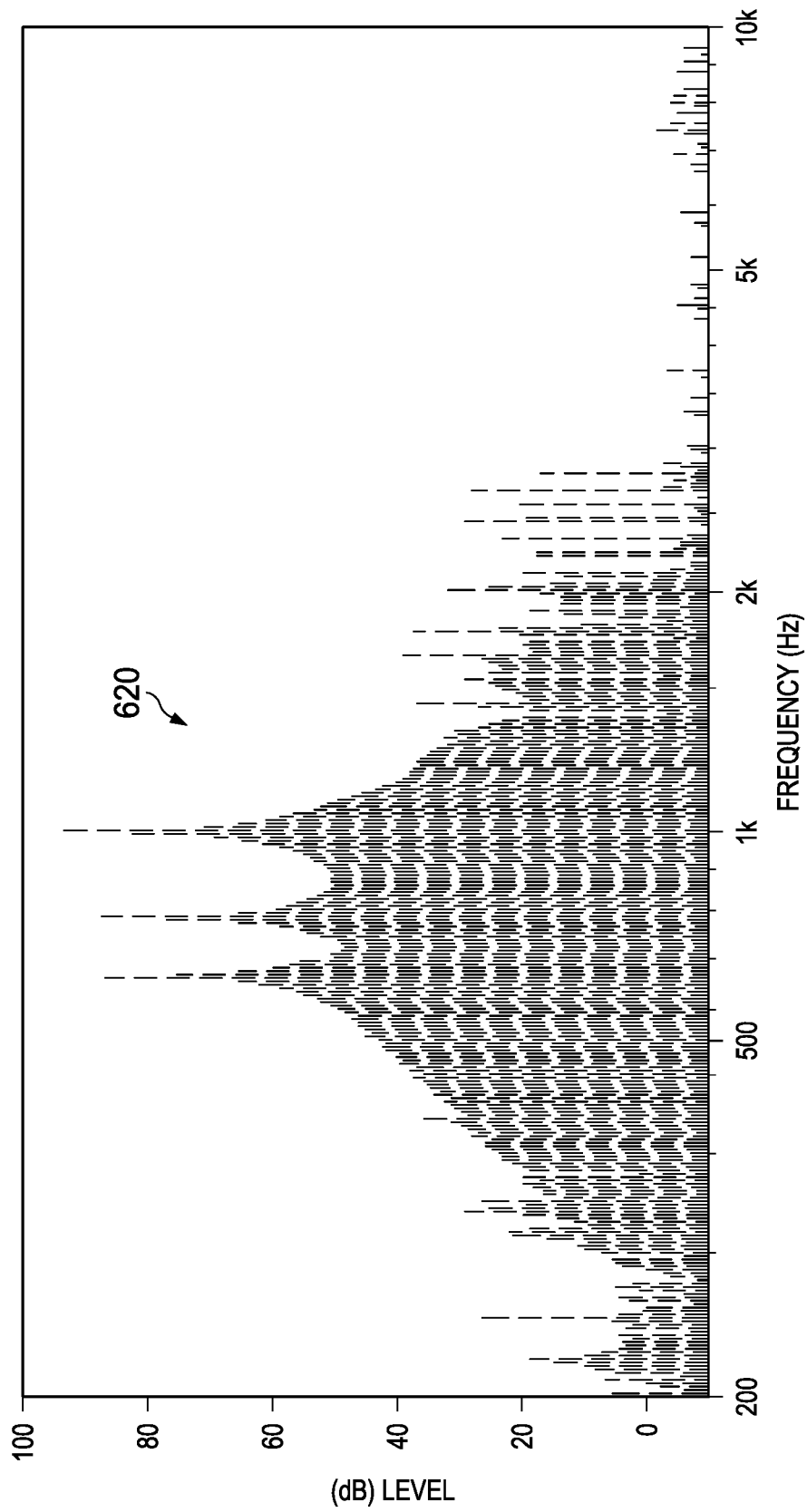

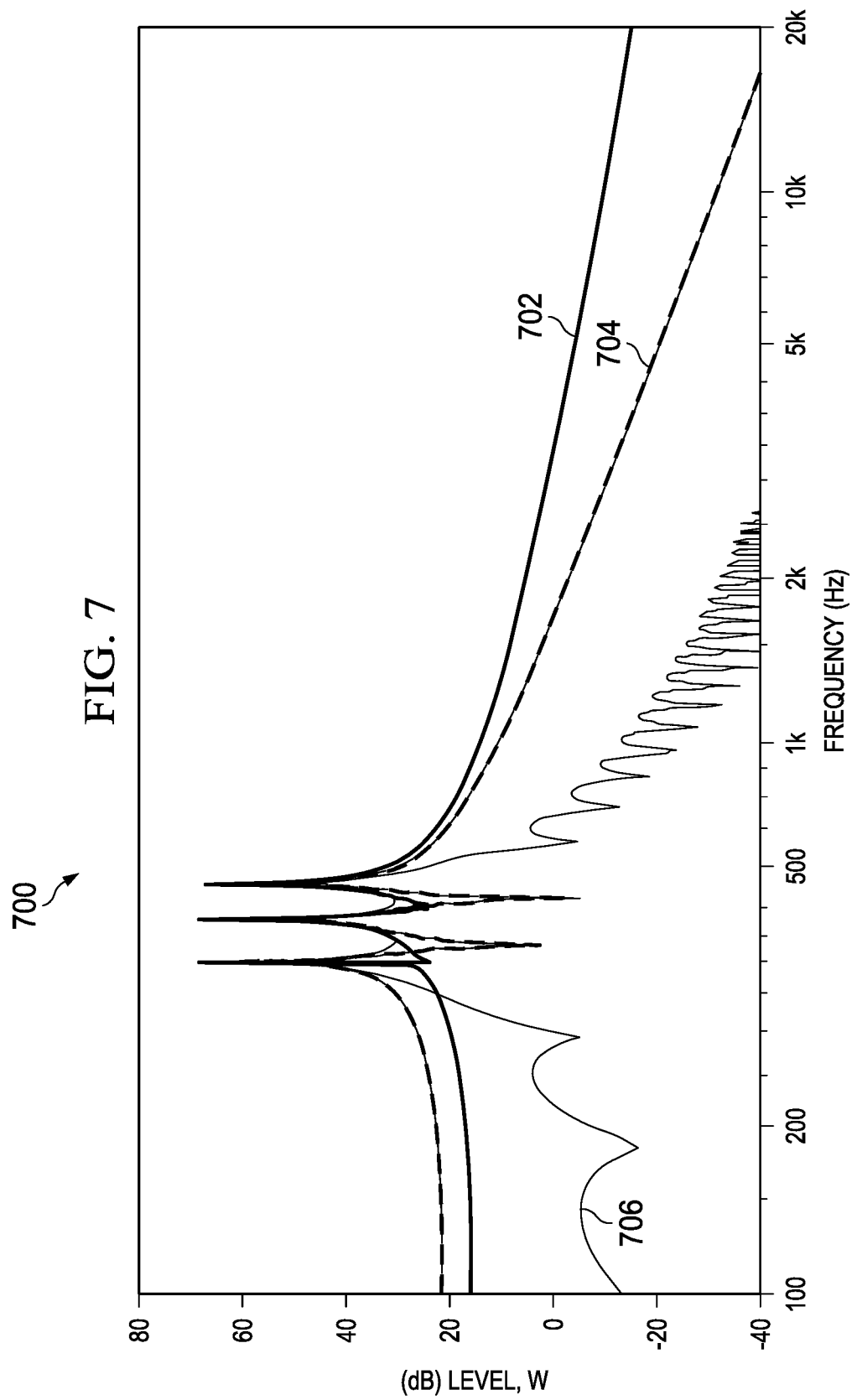

TRANSIENT MULTI-TONE TEST SIGNAL AND METHOD FOR AUDIO SPEAKERS

CROSS-REFERENCE TO RELATED APPLICATIONS

This application claims the benefit of priority from U.S. Provisional Patent Application No. 63/030,812, filed on 27 May 2020, and U.S. Provisional Patent Application No. 63/185,567, filed on 7 May 2021, which are hereby incorporated by reference.

TECHNICAL FIELD

Embodiments relate generally to generating a multi-tone test signal for testing audio loudspeakers to detect piano noise distortion.

BACKGROUND

The requirement for high quality audio playback from small portable devices such as mobile phones, tablets, and notebook computers, has led to higher quality control standards for small-scale (micro-transducer) speakers. Because of their small size, tight tolerances, and limited air volume, even minute production flaws in such speakers can result in significant audio degradation.

Piano noise is a type of distortion in loudspeakers that has been identified as a common problem primarily affecting micro-transducers that are used in small portable devices. Piano noise can be a very audible distortion that can occur even at relatively low output levels when certain types of audio signals are reproduced. As the name suggests, this type of distortion primarily affects piano tone reproduction, but other types of sound also simulate the distortion such as chimes (e.g., the well-known tones played upon computer startup) or content with similar timbre.

Smaller speakers are especially prone to this distortion problem because the enclosed air volume behind the transducer extending into the loudspeaker module and the air surrounding the speaker in portable devices is limited. This problem is exacerbated in micro-transducers because the ratio of the driver radiating surface area to the air volume in the enclosure is much higher than in more conventional loudspeaker systems, resulting in high compressions of the trapped air. If air is drawn into and expelled from the enclosure through small leaks, acoustic artefacts (such as manifested by a buzzing sound) can easily be produced. Since these artefacts are often separated in frequency from the audio or content signal, their audibility is enhanced, thus leading to perceptible distortion.

Present methods of testing production audio speakers typically involves using a simple test tone to provide a simple functional pass/fail test of a speaker. They do not provide any mechanism for identifying subtle or minor distortion, which may not be enough to fail a device, but is still bad enough to render a speaker useless for most playback applications.

SUMMARY OF EMBODIMENTS

Embodiments include a method of testing an audio speaker for piano noise distortion by generating a transient test signal having distinct formant tones configured to allow frequencies and harmonics to remain distributed in frequency, wherein the test signal occupies a stimulus region within an audio spectrum. The test signal is applied to the speaker, and a microphone response of the speaker is measured to capture a frequency response within an analysis region of the audio spectrum that is separate from the stimulus region. The measured microphone response is compared to a derived baseline value to determine a pass or fail performance of the speaker for reporting back to a user.

Embodiments are further directed to a method of testing speakers by obtaining standard frequency response measurements and piano noise measurements for a sample number of speakers within a batch to derive a threshold value distinguishing passing versus failing speaker with respect to piano noise distortion, and generating a test signal having several distinct formant tones resembling a piano chord and selectable such that the frequencies and harmonics remain distributed in frequency. The test signal is shaped as an impulse signal having a burst power applied over a shaped decay period, which is then applied to each speaker. The respective speaker response is then recorded, and used to derive a piano noise distortion level for each speaker. This derived distortion level is compared to the threshold value to determine a passing or failing performance of each speaker, and results can be reported back to a user.

Embodiments are further directed to a system generating a test signal having a number of distinct formant tones resembling a piano chord and selectable such that the frequencies and harmonics remain distributed in frequency, wherein the test signal occupies a stimulus region within an audio spectrum and applying the test signal to the speaker. The system obtains baseline measurements with respect to standard audio response and piano noise distortion. The test signal applied to the speaker under test may be an impulse signal that is shaped with respect to power, decay time, and decay envelope shape to provide a basis of identifying piano noise components within the frequency response of the speaker. The output of the speaker is provided to an analyzer that capture a frequency response of the speaker and compares the measured microphone response to the baseline measurements to determine a pass or fail performance of the speaker that is then communicated to a user.

Such embodiments thus use a short-term (transient) test signal having a frequency spectrum between separate stimulus and analysis bands to clearly show the test signal separate from any resulting distortion artifacts. The frequency spacing and progression of the individual distinct formant tones is configured to excite harmonic and non-harmonically related tones that can be clearly displayed in the analysis region if caused by a defective speaker.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 6A is an example response plot for a test of a small speaker using the test signal of FIG. 3, under an example embodiment.

FIG. 6B illustrates the graph of FIG. 6A showing only the response plot for a good speaker.

FIG. 7 is a graph illustrating the effects of windowing the amplitude of the test signal with respect to time, under some embodiments.

DETAILED DESCRIPTION

Embodiments are directed to generating and using test signals to detect and identify audio distortion manifested as piano noise, especially with respect to micro-transducer speaker systems. Such a test signal can be used in an overall test methodology to evaluate speakers produced commercially by speaker manufacturers. Any of the described embodiments may be used alone or together with one another in any combination. Although various embodiments may have been motivated by various deficiencies with the current and known solutions, which may be discussed in the specification, the embodiments do not necessarily address any of these deficiencies. Different embodiments may address different deficiencies, and some may only be partially addressed.

For purposes of the present description, the following terms have the associated meanings: the term "speaker" or "loudspeaker" means an audio playback speaker having a cabinet or provided in an enclosure enclosing one or more drivers, where the term "driver" means an individual audio transducer that converts an electrical audio signal into sound waves, and may be implemented as a cone, dome, compression driver, micro-speaker, or planar driver, and may be a full-range driver or a driver configured to playback a certain frequency range, such as a tweeter, mid-range driver, woofer, sub-woofer, and so on. The term "cabinet" means a speaker enclosure or box that houses the transducer or transducers (or drivers) and that is typically wholly enclosed to acoustically isolate the rear of the transducers, but that may also be vented or partially open if needed for certain audio response characteristics. A cabinet may comprise part or all of a device enclosure (e.g., mobile phone or portable computer) that integrates the speaker within its housing. The term "artefact" means an aberration caused by distortion, such as in an acoustical signal and that may be manifest as an unwanted but perceptible audio component at a frequency or range of frequencies in a speaker response.

As stated above, small speakers can suffer from manufacturing or material flaws that cause micro-leaks between the enclosed air volume behind the transducer and the air surrounding the loudspeaker. Such a problem is generally a greater issue for micro-transducer speakers because of the large ratio of the transducer radiating surface to the air volume in the enclosure, resulting in high compressions of trapped air. If severe enough, such leaks can cause audible distortion due to audio artefacts that are separate from the audio spectrum of the content itself.

Figure 1:
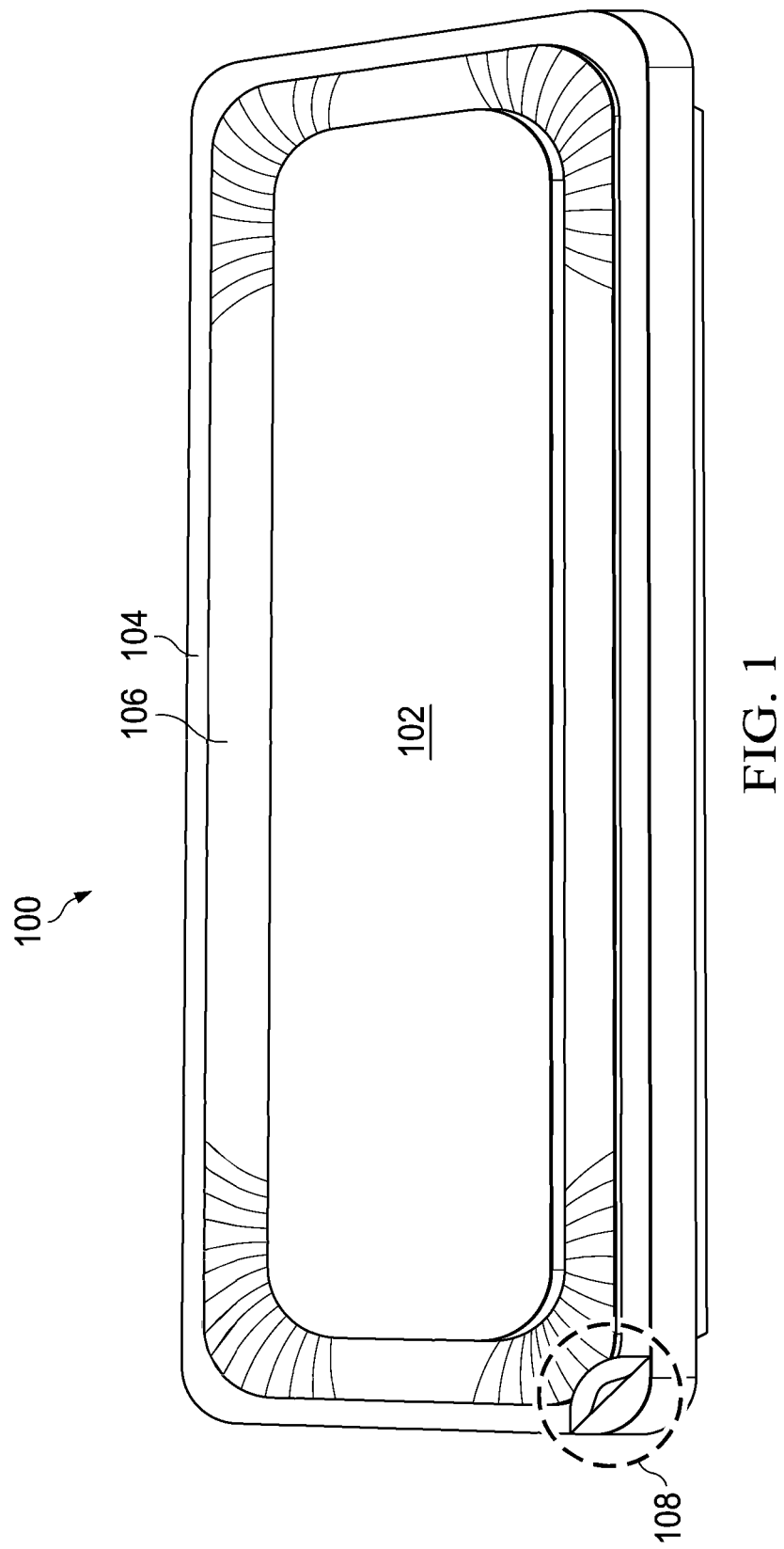
FIG. 1 illustrates a defective small-scale transducer speaker that can be tested using a tri-tone test signal, under some embodiments.

FIG. 1 illustrates a defective small-scale transducer speaker that can be tested using an audio signal and test methodology, under some embodiments. As shown in FIG. 1, speaker 100 includes a transducer (or diaphragm) 102 that is affixed to a frame 104. The transducer comprises a thin membrane made of paper, laminate material, or a plastic (e.g., polypropylene), that is suspended at its edges through a flexible structure (suspension land) 106. If there are any holes or rips in the transducer material, the speaker will not function properly. For proper performance, it is also critically important that the diaphragm material 102 and the suspension land 106 are properly integrated or bonded to one another. They must also be aligned and properly bonded to the frame 104. Any gaps between the diaphragm, border, and frame can render a speaker useless. As with a hole in the diaphragm, such an air leak usually manifests itself as an audible rattle or similarly annoying sound during audio playback.

FIG. 1 illustrates an example defect in speaker 100 in the form of an air gap 108 in one corner of the speaker caused by incomplete bonding of the suspension land with the frame. Depending on the size and configuration of the speaker, even the smallest gap can cause audible distortion. The dimensions, composition, shape and configuration of speaker 100 is an example of a small-scale speaker used in portable device products, such as mobile phones and the like. Such a speaker is typically shaped to fit into restricted areas, and hence may be elongated (as shown) to provide a maximum transducer area for small narrow locations within the device. For purposes of illustration, the speaker 100 of FIG. 1 is a small speaker with a transducer on the order of 13 mm by 38 mm in size, and used in a small enclosure of about 4 cubic centimeters. This size speaker is generally suitable for use in a 12" to 15" laptop or notebook computer, but even smaller speakers are commonly used in mobile phones and tablet computers.

Small speakers are characterized by the fact that the area of the transducer 102 is relatively large compared to the area and are volume around the speaker 100, hence, even minute manufacturing defects can cause some degree of audible distortion.

It should be noted that although embodiments are illustrated and described with respect to small or micro-scale speakers, it should be noted that embodiments are not so limited, and speakers of any size or configuration may be tested using the test signals and methodology described herein.

During mass production of small-scale speakers, it is not uncommon for a number of speakers to leave a factory with defects such as shown in FIG. 1 due to cost constraints and the difficulty of performing extensive visual inspections. For example, the speaker 100 illustrated in FIG. 1 exhibits a common problem of an air leak caused by one or more small gaps in the frame where the lead out wires are routed. Since micro-speakers often do not have wires routed into a back volume (due to restricted speaker depth), wires must often run out of the front of the speaker and under or edge of the transducer 102. Other types of defects can also be common for small-scale speakers, such as defective or loosely bonded suspension lands, pinpoint holes in transducers, and so on. Any such defect generally produces a region where minute leaks between the trapped air behind the diaphragm and the outer air can cause problems. Piano noise distortion is generally associated with such air leak problems, and can be distinguished by other sources of high harmonic distortion, such as mechanically induced vibrations (e.g., rub and buzz).

In certain cases, speakers are designed with vents or ports to accommodate components (e.g., motors) and/or to shape the sound of the speaker. In this case, blocking any intended vents may cause the same or similar type of distortion by the speaker.

Embodiments are directed to a testing methodology that uses a unique test signal to effectively detect air-leakage defects in speakers, such as speaker 100. The test signal is configured to detect piano noise distortion, which is a type of distortion generally caused by small micro-leaks of air from behind the transducer into the surrounding area. Embodiments thus include a test signal that was developed to diagnose the piano noise issue associated with air leakage from small-scale transducers.

Test Signal Derivation

Piano tones generally feature a high attack and fast decay tone, where individual frequencies (notes) are suitably well defined, whether played individually or in a chord. Revealing a piano noise problem in a speaker requires exciting it with an appropriate signal type. It has been discovered that audio content containing piano chords has highlighted the piano noise problem in a number of speakers that were found to be defective. Based on this discovery, a test signal recreating a piano chord was developed. Such a test signal accounted for the formant structure and temporal envelope of the signal, but omitted upper harmonics to result in a useful test signal. Upper harmonic content normally gives a specific character to a piano sound. However, the test signal deliberately omits this upper harmonic content in order to leave the upper spectrum vacant for the purpose of analyzing artefacts produced by potential defects, and that were known to occupy these bands.

Derivation of the test signal allows users to excite the speakers and collect data for the distortion, and also to hear the problem as clearly as would be the case when reproducing piano content so that some evaluation of the threshold of acceptable distortion can be established. The representative test signal thus highlights the distortion and simplifies the evaluation and quantification process for testing large samples or production lots of speakers.

In an embodiment, an audio test signal was derived using certain observations and evaluations obtained during experimental procedures. Such procedures were used to formulate a piano noise test signal containing a number (e.g., three) distinct formant frequencies. A piano note typically consists of a formant (dominant) tone, followed by a train of odd and even harmonics. It was established that although single notes could excite the noise, chords (multiple formants) made the distortion more obviously perceptible. Additionally, it was found that the upper harmonics, that would normally give the piano a differentiating sound (Steinway vs Bosendorfer), had less value in terms of exciting the distortion. In deriving the test signal, many piano samples were analyzed and the temporal and harmonic structures were evaluated. It was generally found that the artefacts produced by piano noise distortion are harmonically related, but exciting mainly higher orders (e.g., $7^{th}$ order and higher). It was found that properties of air itself, specifically the bulk modulus, are potentially subject to change due to the high compression resulting in a secondary distortion exciting lower harmonics and intermodulation (sum and difference) tones.

Figure 2:
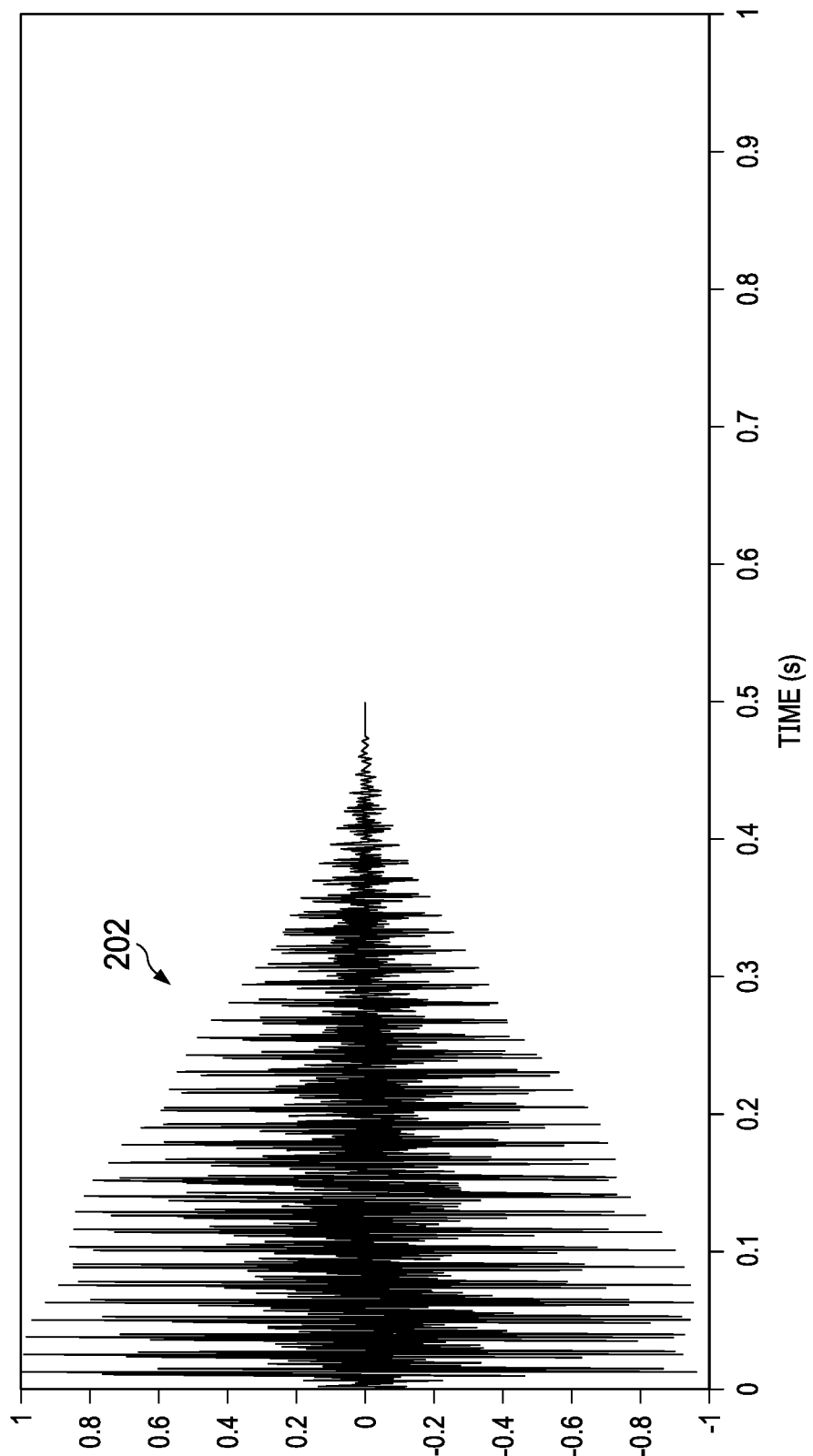
FIG. 2 illustrates the time response of a transient multi-tone test signal, under some embodiments.

As stated above, the derived piano noise test signal is a transient irregular audio signal containing three formant frequencies. FIG. 2 illustrates the time response of an audio test signal, under some embodiments. Graph 200 of FIG. 2 illustrates amplitude over time for the test signal 202. To create short term events similar to piano notes, a linearly decaying window was used to taper the amplitude of the test signal from 1V to 0V over 0.5 seconds. FIG. 2 illustrates one example of a test signal impulse, and many other test signal impulses can be used. The relevant parameters for such an impulse are the impulse power, decay time, and decay envelope (e.g., tapered downward, tapered upward, square, pulse, and so on). Thus, the example of FIG. 2 shows a test signal impulse encompassing 0.5 seconds with a linear decay taper, but other envelop decay times and taper profiles can also be used.

The test signal 202 is provided as a short burst type signal to ensure low power dissipation in the speaker under test. The test signal is configured to stress the loudspeaker mechanically and force air through any air gaps or leaks that might be present. The burst signal contains the formant tones at high amplitude to highlight that piano noise problem. The test signal is provided as a burst and not a sustained signal to reduce the risk of any thermal changes or failure of the speaker.

To generalize the test signal to suit loudspeakers with different frequency ranges, a means of selecting a suitable range for the test tone impulse was established. A "tri-tone" (three formant) signal was generated such that the frequency of the first tone is at a standard ⅓ octave frequency and the subsequent tones are set as multipliers based on a golden ratio approach. The frequencies of the formants can be chosen arbitrarily based on the chords observed in a shared excerpt of piano music, or they can be spread more broadly in the spectrum by selecting formant tones that are harmonically uncorrelated. Although embodiments are described for a tri-tone test signal, other numbers of formant tones are also possible.

With respect to the time-domain element of the test signal, as shown in FIG. 2, the test signal 202 is a short-term or transient signal that is non-stationary, and is also referred to as a signal 'burst.' During testing, the test signal can be applied to one or more speakers as a single burst, or a finite series of bursts (e.g., 8 to 24 bursts).

Figure 3:
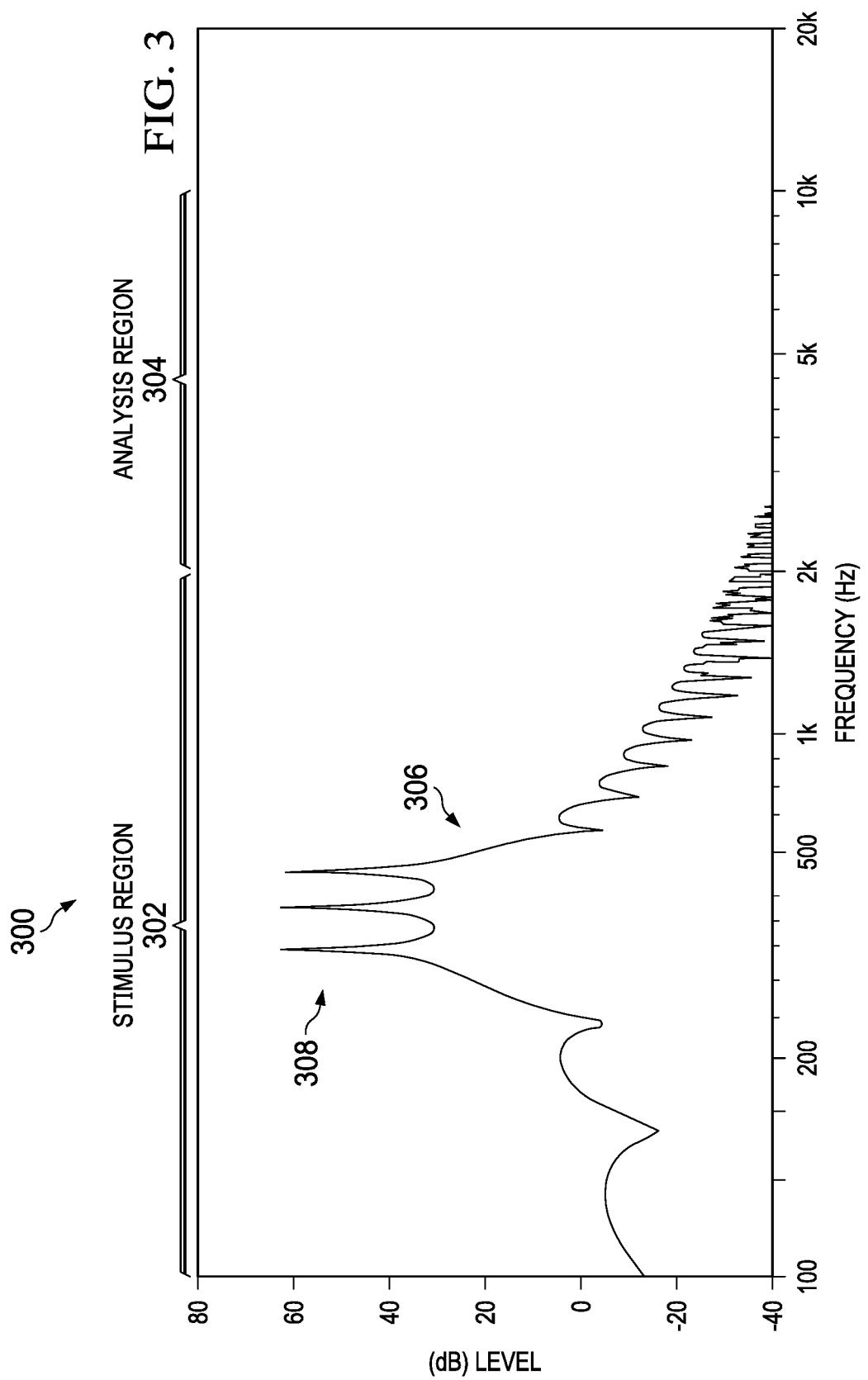
FIG. 3 is a frequency spectrum plot of the multi-tone test signal of FIG. 2, under some embodiments.

FIG. 3 is a frequency domain representation of the test signal of FIG. 2, under some embodiments. Graph 300 of FIG. 3 illustrates the frequency response in dB for test signal 306. The test signal 306 is generated within a selected frequency range (e.g., 100 Hz to 2 kHz), denoted as the 'stimulus region' 302, and is applied to the speaker under test. The response of the speaker is then observed in the 'analysis region' 304 (e.g., 2 kHz to 10 kHz). The analysis region 304 is created by omitting the upper harmonic of the test signal, as mentioned above.

Figures 4, 5:
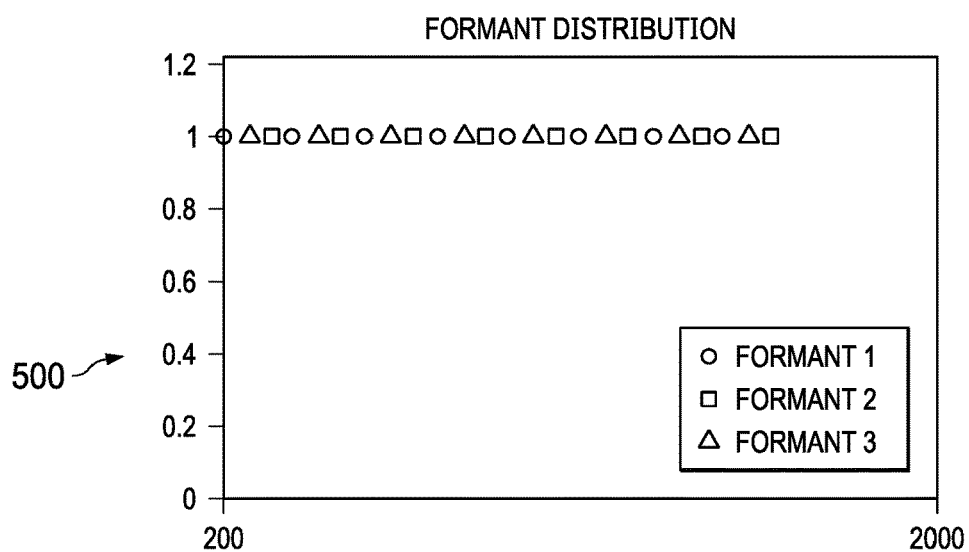
FIG. 4 is a table 400 illustrating different values for the three formants of the test signal of FIG. 3, under some embodiments.
FIG. 5 is a graph illustrating a distribution of the formants in the table of FIG. 4, under some embodiments.

As shown in FIG. 3, the test signal 306 is formed to include three distinct formants (shown as signal peaks) 308. Using the golden ratio approach, a formant ratio of 1:1.09:1.17 was used to give a regular log-frequency spacing which would be reflected in the distribution of harmonics. This ratio has been demonstrated to be enough to excite any appropriate speaker when applied within the stimulus region 302. FIG. 4 is a table 400 illustrating different values for the three formants 308 of FIG. 3, under some embodiments. Table 400 shows the generated formant tones using the ratio described based upon a standard ⅓ octave progression in frequency for the first tone. This is scalable in bandwidth, so for micro-transducers, the system may be configured to begin the stimulus generation at 200 Hz, for example, to avoid exciting the loudspeaker outside the range where it would be used.

Although embodiments are described with respect to a test signal with three formant tones, embodiments are not so limited, and other practical number of formant tones may be used such as from 2 to 24 formant tones. Three formant tones was found to generate satisfactory discrimination of the worst case excitation band given the speaker resonance as related to internal air pressures for typical micro-speakers, but fewer or more formant tones may be used depending on speaker design and defect characteristics. In an embodiment, the number of formant tones and their relative spacing may be user selectable to allow further tailoring of the test signal to suit particular types of speakers.

FIG. 5 is a graph illustrating the distribution of the formants for table 400 of FIG. 4, under some embodiments. Graph 500 illustrates that on a log-frequency scale, the formants remain distributed in frequency. The process excites harmonic and non-harmonically related tones and avoid overlapping stimuli between the steps. The analysis region 304 should therefore contain harmonics and inter-modulation artefacts that would not be excited using a single tone.

In an example embodiment, the test signal of FIG. 3 was applied to a laptop computer module incorporating a small driver (e.g., 13 mm×38 mm driver in a 4 cubic centimeter enclosure). The module was deliberately damaged by making a hole in the front side and rear side of the enclosure to simulate a real defect. The test signal was increased in frequency at ⅓ octave increments to investigate the frequency range that produced the greatest level of artefacts in the analysis region between 2 kHz and 10 kHz. FIG. 6A is an example response graph 600 for this test setup. As shown in FIG. 6A, graph 600 illustrates the test signal 602 applied within the stimulus region (200 Hz to 2 kHz), and example resultant response plots within the analysis region (2 KHz to 10 KHz). Plot 608 of graph 600 illustrates an example response for a fully sealed speaker, i.e., no defects, while plot 610 illustrates an example response for a speaker with a hole in the rear of the speaker. As can be seen in FIG. 6A, the response plot 610 for the defective speaker shows significant signal in the analysis region of the spectrum, on the order of +20 to +30 dB above the non-defective speaker 608.

Figure 6C:
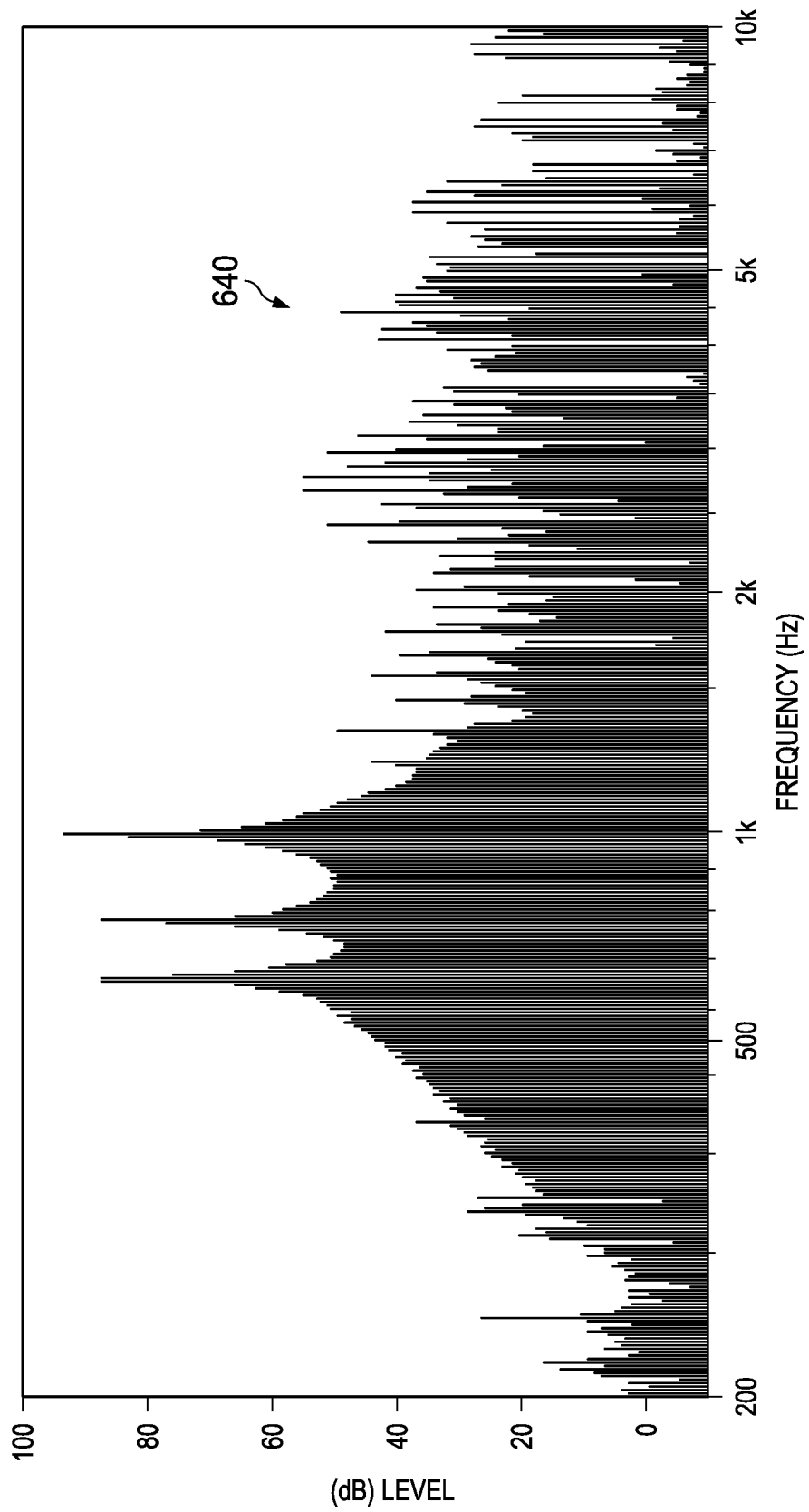
FIG. 6C illustrates the graph of FIG. 6A showing only the response plot for a defective speaker.

FIG. 6B illustrates the graph of FIG. 6A showing the response plot for a good speaker. As can be seen in FIG. 6A, the test signal 620 is confined to the stimulus region up to 2 kHz, while the upper frequency region is left vacant, except for any minor or residual noise. When the test signal is applied to a good speaker, the analysis region should not show any significant artefacts, as illustrated in FIG. 6B. FIG. 6C illustrates the graph of FIG. 6A showing the response plot for a defective speaker. In this case, the test signal causes perceptible artefacts 640 to show up in the analysis region in the frequency range above 2 kHz.

It should be noted that plot 610 is an example plot for a defective speaker with an air leak caused by a gap or hole in the diaphragm, surround, or interface therebetween. Such a defect can be serious enough to result in very apparent artefacts in the analysis region. This plot is shown for purposes of illustration, and embodiments may be applied to other defects, such as any manufacturing deviation that causes air leakage in the speaker that may produce different or smaller artefact patterns.

With reference to FIG. 6A, in addition to the spectra of the measured loudspeaker module, the displacement curve of the transducer (in dBr) is overlaid to investigate any relationship the distortion has with displacement and internal enclosure pressure. Plot 606 shows the diaphragm displacement corresponding to the response plot, and is shown as a reference relative to the lower plot 602 showing the acoustic response for a defective device producing noise in the upper frequency ranges. It can be seen in FIG. 6A that high distortion generally correlates with excitation frequencies centered where the driver displacement and hence enclosure pressure is greatest and the test tone where the first formant is at 400 Hz is a revealing test signal for this particular loudspeaker module.

With respect to the bands affected by piano noise, certain experimental data has shown that for speakers where the driver area is large and the back volume is small, two distinct artefacts usually appear. Low-order inter-modulation distortion (IMD) and harmonic distortion (HD) appears in both sealed and leaky enclosures and sounds more subtle than the upper frequency distortion referred to as piano noise. Piano noise exists at higher frequencies than the low order HD and IM distortion, and studies have shown that blocking any unwanted small apertures or gaps results in a marked improvement in audio quality when piano type sounds are reproduced.

It has also been found that transient multiple tone signals are able to highlight the piano noise issue. In certain cases, increasing the number of excitation tones within the high displacement bandwidth (<F0) adds benefits in terms of enhancing the distortion and improving the capability of the test. Here, F0 is the resonance frequency of the driver in the enclosure. Approaching this frequency from DC yields an increasing displacement that reaches a maximum at resonance and drops off rapidly above this frequency. The pressure in the sealed box is proportional to the displacement, and therefore the amount of piano noise excitement peaks with the pressure and displacement.

In an embodiment, the test signal 202 can be input to the speaker as a single burst or a series of bursts. Presenting the tri-tone test signal in a number of bursts (e.g., 8 bursts of three tones versus 24 tones in a single burst) has been found to result in no real increase in magnitude, even though the density of the HD and IM distortion is greater in the 24 tone signal. In an embodiment, a sparser tri-tone signal that could be varied over a certain excitation band can be used so that some initial diagnostics are possible. These initial diagnostics included using a Short Time Fourier Transform to identify bands exciting the most piano noise, among other diagnostics. Using the displacement measured for diaphragm velocity as a reference curve, individual one-half second bursts of three tones progressing in ⅓ octave steps from 200 Hz to 1 kHz were analyzed separately for piano noise content. From this, it was confirmed that for an example speaker type, the most piano noise was evident where the diaphragm displacement was greatest. Thus, certain specific excitation bands for unknown loudspeaker modules may be selected for testing.

FIG. 2 illustrates an example test signal 202 that has a linear decay taper over a short duration, e.g., 0.5 seconds. With respect to signal duration, it was found that short duration (0.5 second) bursts are generally adequate to obtain a sufficient signal-to-noise ratio to reliably detect piano noise, thus increasing cycle times is generally not necessary for most speakers and test conditions.

Audio signals naturally decay over time, and FIG. 2 illustrates an example test signal that has a linear decay taper. In an embodiment, the test signal can be modified using different time windowing functions. For example, the test signal could have no taper to produce a rectangular window (such as by truncating the three tones), a linear "inverse sawtooth" taper, a half Hann window, and a half Hann window with 10 ms linear fade-in. A Hann window is a window function that is used for controlling spectral leakage and smoothing frequency response data. Other windowing functions may also be used.

FIG. 7 is a graph illustrating the effects of windowing the amplitude of the stimulus with respect to time, under some embodiments. Graph 700 of FIG. 7 shows a comparison of a rectangular window plot 702, a linear and Hann window, 704, and a Hann window with 10 ms delay 706. This plot comparison shows a linear fade-in over 10 ms combined with a half-Hann window (plot 706) produced the steepest side-band drop. This type of window 706 thus approaches an ideal scenario wherein the upper frequency range (above 2 kHz) is empty and available to show even very subtle artefacts linked to piano noise.

In an embodiment, it is also possible to vacate the entire upper frequency response and dedicate it to defect detection with the possibility of easy limit setting in a quality control setting. This highlights a specific context to the test whereby it is recognized that the defect is excited under 1 kHz by large diaphragm displacements/high internal box pressures and the distortion can be heard as isolated high frequency content. The test can be split into two frequency bands and with the tri-tone test signals applied as decaying transients mimicking the program material that excites the problem and making it audible and obvious.

Testing Methodology

In embodiment, the test signal of FIGS. 2 and 3 are applied to one or more speakers as part of a quality control or product evaluation operation performed in production or after the product is distributed for use. The test signal can be loaded as a stimulus in the form of a WAV file (or similar), and applied to a speaker using an appropriate test rig where the microphone response from the loudspeaker under test can be captured to generate the response for analysis. Such as testing methodology can be used as part of a production quality control operation, or by an installer or user in the field.

The test signal provides a basis for defining normal speaker operating performance and allows a user to define speaker responses that fall outside of normal boundaries by highlighting piano noise detected during speaker playback of the test signal. The test signal can be provided as a portable audio file that can be uploaded to a device for playback over closed systems to detect manufacturing defects in a non-invasive manner The speaker responses can be used to define response profiles or threshold values that distinguish a baseline or good speaker from a bad speaker. The frequency response within the analysis region for any bad speaker can be further investigated to try to determine the nature and cause of the defect that caused the failure, or the speaker can simply be discarded as part of a pass/fail quality control check.

For testing single speakers at a time, a good baseline response must be defined for comparison with the response of the speaker under test. This can be obtained using historical test data, derived based on empirical data, or by defining a universal threshold value for all speakers. For testing batches of speakers at a time, the baseline response value can be obtained by sampling all or a statistically significant number of speakers and listening to the responses of these speakers to derive a baseline value that is then applied to the rest of the speakers to be tested.

Figure 8:
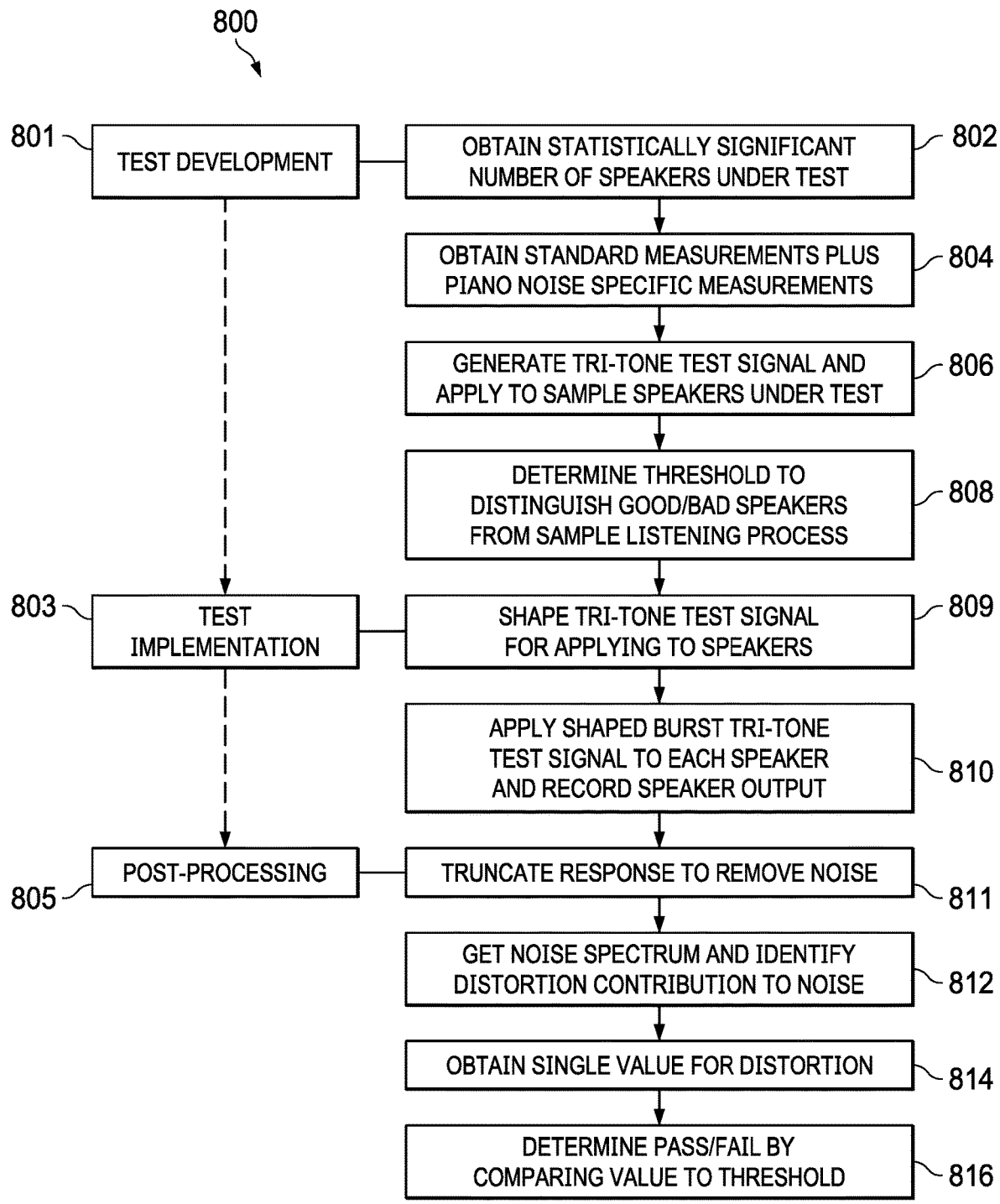
FIG. 8 illustrates a method of testing speakers using a multi-tone test signal, under some embodiments.

FIG. 8 illustrates a method of testing speakers using a tri-tone audio test signal, under some embodiments. The overall method 800 comprises three main phases: a test development phase 801, a test implementation phase 803, and a post-processing phase 805.

The test development phase 801 involves generating the test signal and defining acceptable speaker response to the test signal prior to applying the test signal to batches of speakers in the test implementation phase 803. The first step 802 of the test development phase 801 is obtain a statistically significant number of speakers under test. Such a number depends on the overall production lot being tested, but can be a number of speakers, such as 30+ speakers. This sample is then used to obtain standard measurements, such as speaker impedance, plus piano noise specific measurements, 804.

For this process, an initial tri-tone test signal is used as a burst stimulus (pseudo-piano) centered around module F0, 806. F0 is the resonance frequency where the piano distortion is generally highest for any loudspeaker. A prior impedance measurement from step 804 is used to locate the frequency of resonance. The stimulus frequency is then located there to quickly investigate the worst case piano noise. In an embodiment, an initial batch of loudspeakers is tested to ascertain limits for each of steps 804 to 808. These initial batch limits can be then be refined during initial production and then frozen into full volume production.

The test stimulus in the test development phase 801 is usually posed as a sequence or train of band incrementing bursts that scan the lower frequency range of a loudspeaker for artefacts. A speaker with high damping will not only have a peak displacement at the resonance frequency, but a similar displacement at lower frequencies as well, so it would be valid to excite this low frequency region also. Systems are also often tuned so that the driver sees a higher voltage below resonance to boost bass, which also encourages low frequency stimulus and analysis.

The prior electrical impedance measurements on the initial speaker batch to ascertain the maximum displacement can thus be used to ascertain the best test signal range and root formant frequency for the test signal. This maximizes the detection capability of the test and can be aligned with the driver displacement.

The upper band energy between 2 kHz and 10 kHz (or other analysis regions) is then added to produce a single dB figure that differentiates between good and defective samples in terms of piano noise. Certain experiments on sample modules indicate that bad modules generally produce artefact levels at a certain level (e.g., from 55 dB to 65 dB) and good modules produce artefact levels at a lower level (e.g., from 40 to 43 dB). This provides a relatively generous detection margin and performance limits identifying good, marginal and bad products could be set as the basic quality control process for piano noise. The initial test signal is scalable in frequency such that specific speakers can be scanned at ⅓ octave intervals with the test signal until the response contains the highest density of artefacts.

It should be noted that the dB levels mentioned here are illustrative examples only. For embodiments in which a single value is derived to represent the distortion, the test process sums the energy at discrete frequencies within the analysis band as incoherent pressures (random phase assumed) referenced to a specific SPL (e.g., 20 uPa). This will quantify the amount of energy present in the analysis region and higher values represent distortion. This approach provides an effective pass/fail criteria, though it may not provide in depth frequency discrimination measure, which sometimes helps with diagnostics. However, for bulk testing of production runs, the pass/fail test is efficient and cost-effective.

In the test development phase 801, a technician listens to samples and determines the piano noise acceptance limit in order to sort good and bad speakers in the test lot, 808. This evaluation through listening sorting can then be used to set a numerical initial limit for speaker evaluation. Speaker responses may be subjectively classified by the listener as good, marginal, or bad. Such characterizations are used to derive a single threshold value that separates a good (passing) response from a bad (failing response). Responses representing marginal performance (some distortion or audio artefacts detected) may be classed as good or bad depending on test tolerances, and so on.

Once the test signal and the appropriate good/bad profile or threshold values are defined, they are applied to production speakers or other speakers under test during the test implementation phase 803. The test implementation phase involves defining an appropriate shape and profile to the impulse burst (e.g., FIG. 2) of test signal with respect to envelope, power level, decay times, and so on, 809. The appropriately shaped test signal is then applied to each software, such as using software to play 0.5 s shaped burst (e.g., fade-in+Hann) into the speaker under test, 810. The resulting signal playback from the speaker is then recorded in a controlled standardized test environment.

The post-processing phase 805 is then used to analyze the recorded results. The first post-processing step is to truncate the responses to 0.5 s recoded segments to eliminate noise, 811. In step 812, the process uses FFT segments to get the spectrum of the noise and identify the piano distortion (HH+IMD components) contribution to the bandwidth (above low HD). The windowed HH+IMD distortion artefacts are then summed together to get a single distortion SPL (sound pressure level) value, 814. This value is then compared against the defined threshold (also expressed as an SPL value) to determine pass or failure of the current speaker under test. In this process, a summation of the sound pressure in the analysis band is used to obtain a single distortion SPL value. A good speaker will simply have a low level corresponding to the noise floor of the environment, but a defective speaker will have excited intermodulation tones and high harmonic content spread fairly randomly over the analysis band, as shown in FIG. 6A as the clear distinction between plots 608 (good speaker) and 610 (defective speaker).

FIG. 6A illustrates an example test scenario in which a single 0.5 s test signal burst is applied to a speaker. In an embodiment, a train of 0.5 s bursts may be applied, isolated, and then analyzed to reveal the spectral content of the speaker response. This would yield a sequence of graphs that illustrate how increased noise may be evident around the resonance of the speaker. An overall test process might thus a single tests signal burst, or multiples bursts depending on the specific speaker fault mode.

FIG. 8 illustrates an embodiment in which a test development phase 801 uses control testing to establishes a frequency dependent pass/fail limit separating good and bad speakers. The control result is then applied as an upper limit in the analysis band. In a different embodiment, the pass/fail criteria can be defined by summing the energy in the analysis band and deriving a single value to signal a fail. Such an embodiment produces a simpler test setup, but has a lower resolution than the spectral limit approach described above.

The method 600 of FIG. 6A generates a single test signal for use with speakers within a sample or production lot of speakers that may be embodied as micro-transducer speakers of a defined size and configuration or range of sizes/configurations. Such as test signal splits the spectrum into stimulus and analysis bands to provide easy detection of distortion artefacts (recognizing one to be cause and the other effect), while the tri-tone spacing and progression is defined to avoid overlapping excitation and overemphasis of certain frequencies.

In an embodiment, the test signal can be scaled to adapt the test signal to different speaker configurations and/or testing scenarios, such as for example, halving the ratio while doubling the resolution (⅙ octave), or vice-versa if more or less detail is needed in the data. The start-stop frequencies could also be contextualized to a specific speaker to encompass its most important range. This helps control the amount of data collected with respect to more or less detail. For different loudspeaker sizes, the test regime can simply start the tri-tone stimulus higher or lower in frequency to suit the speaker under test and ensure it passes through the resonance frequency to excite the artefact as much as possible.

Embodiments thus describe an audio speaker test methodology that uses a tri-tone test signal to test for piano noise distortion where the distortion artefacts are audible as well as measurable. This is used to set threshold values for acceptable performance based on listening evaluations. The test signal contains a stimulus that is spectrally separated from the distortion artefacts, facilitating data collection and setting of quality control limits. The test signal features three formant tones resembling a piano chord and selectable such that the frequencies and harmonics remain distributed in frequency. The three formant tones are selected to excite intermodulation (IMD) artefacts in addition to harmonic distortion (HD) artefacts. The test signal is configured with specific time windowing to mimic a piano temporal envelope and minimize spectral leakage, thereby providing adequate measurement headroom. The shaped test signal is then applied to any other speakers under test to provide pass/fail analysis of these speakers with respect to excessive piano noise problems.

Figure 9:
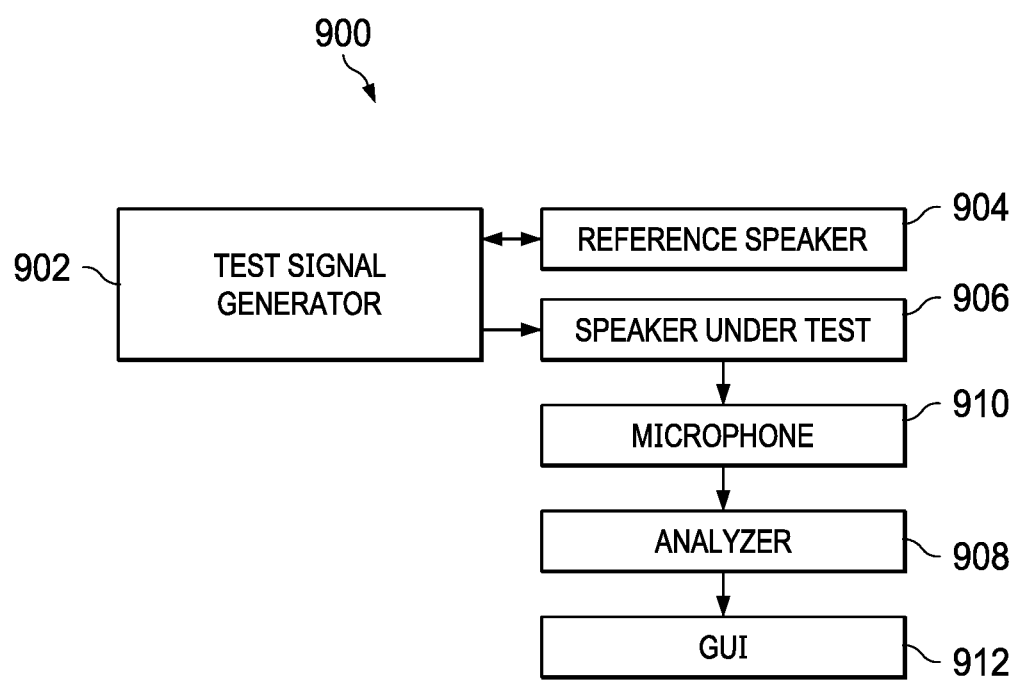
FIG. 9 illustrates a test system implementing a test method using multi-tone test signal, under some embodiments.

In an embodiment, the test methodology may be provided or used as part of a testing system. FIG. 9 illustrates a test system implementing a test method using tri-tone test signal, under some embodiments. As shown in FIG. 9, system 100 includes a test signal generator 902 generating a test signal having three formant tones resembling a piano chord and selectable such that the frequencies and harmonics remain distributed in frequency, wherein the test signal occupies a stimulus region within an audio spectrum and applying the test signal to the speaker. The test signal is input to one or more speakers under test 906. This test signal may be derived by first providing the test signal to a reference speaker to obtain baseline measurements with respect to standard audio response and piano noise distortion. The test signal applied to the speaker under test 906 may be an impulse signal that is shaped with respect to power, decay time, and decay envelope shape to provide a basis of identifying piano noise components within the frequency response of the speaker 906. The output of the speaker 906 is picked up by microphone 910 and provided to an analyzer 908, which measures the microphone response of the speaker to capture a frequency response and compare the measured microphone response to a derived baseline value from the reference speaker 904 to determine a pass or fail performance of the speaker 906. A graphical user interface (GUI) 912 is then used to report this result back to a user.

System 900 is provided for purposes of illustration only, and other components and sub-components may be used as well or instead of those shown. Such components are configured to provide at least some of the hardware elements to perform all or at least some of the processing steps of test method 800 of FIG. 8.

Unless the context clearly requires otherwise, throughout the description and the claims, the words "comprise," "comprising," and the like are to be construed in an inclusive sense as opposed to an exclusive or exhaustive sense. Words using the singular or plural number also include the plural or singular number respectively. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not so limited. Where more than one embodiment is described in detail, any significant features common to multiple embodiments are indeed common to those embodiments. The description is intended to cover various modifications and similar arrangements as would be apparent to those skilled in the art. Therefore, the scope of the appended claims should be accorded the broadest interpretation so as to encompass all such modifications and similar arrangements.

It is claimed:

1. A method of testing a speaker to detect piano noise distortion played back by the speaker, comprising:
    generating a transient test signal having three distinct formant tones configured to allow frequencies and harmonics to remain distributed in frequency, wherein the formant tones are adapted to excite intermodulation distortion, IMD, artefacts and harmonic distortion, HD, artefacts from the speaker, and wherein the test signal is configured with a specific time windowing to mimic a piano-type temporal envelope and minimize spectral leakage, and wherein the test signal is an impulse signal and is contained in a stimulus region within an audio spectrum;
    applying the test signal to the speaker;
    measuring a microphone response of the speaker to capture a frequency response within an analysis region of the audio spectrum separate from the stimulus region; and
    comparing the measured microphone response to a derived baseline value to determine a pass or fail performance of the speaker for reporting back to a user;
    wherein the piano noise distortion comprises IMD and HD components present in the analysis region of the test signal,
wherein the impulse signal has a sound pressure level decaying according to a decay envelope over a specified time period to obtain the captured frequency response of the speaker to the test signal and wherein the method further comprises shaping the impulse signal prior to the applying step by defining at least one of a length of the time period, an initial power of the sound pressure level, and a shape of the decay envelope.

2. The method of claim 1 wherein the stimulus region is between 200 Hz and 2 kHz, and the analysis region is between 2 kHz and 10 kHz.

3. The method of claim 1 further comprising:
    obtaining a statistically significant number of sample speakers among a plurality of speakers to test;
    obtaining standard frequency response measurements and piano noise specific response measurements for at least one of the sample speakers;
    generating the test signal from the obtained standard and piano noise specific response measurements;
    applying the test signal to other speakers of the sample speakers;
    listening to a response from each of the other speakers to derive a passing response and a failing response; and
    deriving a sound pressure level threshold value within the analysis region to distinguish the passing response from the failing response.

4. The method of claim 3 wherein the length of the time period is between 0.1 to 0.5 seconds, and the shape of the decay envelope is one of a linear decreasing decay, and a windowed linear decay with a time-based fade.

5. The method of claim 3 further comprising summing the IMD and HD components contributions to obtain a single distortion value and comparing the single distortion value to the threshold value to determine a passing or failing performance of the speaker.

6. The method of claim 3 wherein the test signal is applied to the speaker as a sequence of periodic bursts, and wherein a response from each sequential burst is isolated and analyzed to allow examination of a spectral content of the overall speaker response to reveal noise present around a resonance frequency of the speaker.

7. The method of claim 6 wherein the speaker comprises a micro-transducer and wherein piano noise distortion is a type of distortion caused by air leakage from behind the micro-transducer into air surrounding the speaker.

8. A system for testing an audio speaker to detect piano noise distortion played back by the speaker, comprising:
    a generator generating a transient test signal having three formant tones configured to allow frequencies and harmonics to remain distributed in frequency, wherein the formant tones are configured to excite intermodulation distortion, IMD, artefacts and harmonic distortion, HD, artefacts from the speaker, and wherein the test signal is configured with a specific time windowing to mimic a piano-type temporal envelope and minimize spectral leakage, and wherein the test signal is an impulse signal contained in a stimulus region within an audio spectrum and is applied to the speaker and is shaped to have a sound pressure level decaying according to a decay envelope over a specified time period to obtain the captured frequency response of the speaker to the test signal, the shape further defining at least one of a length of the time period, an initial power of the impulse signal, and a shape of the decay envelope;
    an analyzer measuring a microphone response of the speaker to capture a frequency response within an analysis region separate from the stimulus region of the audio spectrum, and comparing the measured microphone response to a derived baseline value to determine a pass or fail performance of the speaker for reporting back to a user; and
    a graphical user interface reporting the pass fail performance as a speaker test result to a user;
    wherein the piano noise distortion comprises IMD and HD components present in the analysis region of the test signal.

9. The system of claim 8 wherein the analyzer further:
    obtains a statistically significant number of sample speakers among a plurality of speakers to test;
    obtains standard frequency response measurements and piano noise specific response measurements for at least one of the sample speakers;
    generates the test signal from the obtained standard and piano noise specific response measurements;
    applies the test signal to other speakers of the sample speakers;
    listens to a response from each of the other speakers to derive a passing response and a failing response; and
    derives a sound pressure level threshold value within the analysis region to distinguish the passing response from the failing response.

10. A method of testing speakers, comprising:
obtaining standard frequency response measurements and piano noise measurements for a sample number of speakers within a batch to derive a threshold value distinguishing passing versus failing speaker with respect to piano noise distortion;
generating a transient test signal having three formant tones resembling a piano chord and selectable such that the frequencies and harmonics remain distributed in frequency, wherein the formant tones are adapted to excite intermodulation distortion, IMD, artefacts and harmonic distortion, HD, artefacts from the speakers, and wherein the test signal is configured with a specific time windowing to mimic a piano-type temporal envelope and minimize spectral leakage, and wherein the test signal is shaped as an impulse signal;
applying the impulse signal to each speaker of the speakers and recording a respective response;
deriving a piano noise distortion level for each speaker from their recorded respective response; and
comparing the derived distortion level to the threshold value to determine a passing or failing performance of each speaker;
wherein the piano noise distortion comprises IMD and HD components present in an analysis region of the test signal, and wherein the impulse signal is contained in a stimulus region of the test signal that is separate in the frequency domain from the analysis region,
wherein the impulse signal has a sound pressure level decaying according to a decay envelope over a specified time period to obtain the captured frequency response of the speaker to the test signal and wherein the method further comprises shaping the impulse signal prior to the applying step by defining at least one of a length of the time period, an initial power of the sound pressure level, and a shape of the decay envelope.

11. The method of claim 10 wherein the length of the time period is between 0.1 to 0.5 seconds, and the shape of the decay envelope is one of a linear decreasing decay, and a windowed linear decay with a time-based fade.

* * * * *

UNITED STATES PATENT AND TRADEMARK OFFICE
CERTIFICATE OF CORRECTION

| | | |
|---|---|---|
| PATENT NO. | : 12,207,060 B2 | Page 1 of 1 |
| APPLICATION NO. | : 17/926837 | |
| DATED | : January 21, 2025 | |
| INVENTOR(S) | : Griffiths et al. | |

It is certified that error appears in the above-identified patent and that said Letters Patent is hereby corrected as shown below:

In the Claims

Column 14, Line 20, In Claim 7, delete "micro- transducer" and insert --micro-transducer-- therefor Signed and Sealed this
Twenty-eighth Day of October, 2025

John A. Squires
*Director of the United States Patent and Trademark Office*